(12) United States Patent
Kang et al.

(10) Patent No.: US 11,003,299 B2
(45) Date of Patent: May 11, 2021

(54) TOUCH SCREEN DRIVER CIRCUIT AND TOUCH SENSOR DISPLAY DEVICE

(71) Applicant: LG DISPLAY CO., LTD., Seoul (KR)

(72) Inventors: HyeongWon Kang, Seoul (KR); HongJu Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/693,002

(22) Filed: Nov. 22, 2019

(65) Prior Publication Data

US 2020/0183539 A1 Jun. 11, 2020

(30) Foreign Application Priority Data

Dec. 10, 2018 (KR) ........................ 10-2018-0157988

(51) Int. Cl.
*G06F 3/044* (2006.01)
*G06F 3/041* (2006.01)

(52) U.S. Cl.
CPC .......... *G06F 3/0446* (2019.05); *G06F 3/0418* (2013.01); *G06F 3/04164* (2019.05)

(58) Field of Classification Search
CPC .. G06F 3/0446; G06F 3/04164; G06F 3/0418; G06F 3/0412
See application file for complete search history.

(56) References Cited

U.S. PATENT DOCUMENTS

2015/0091859 A1\* 4/2015 Rosenberg .............. G06F 3/044
345/174
2017/0090668 A1\* 3/2017 Agarwal ................. G06F 3/044

\* cited by examiner

*Primary Examiner* — Charles V Hicks
(74) *Attorney, Agent, or Firm* — Birch, Stewart, Kolasch & Birch, LLP

(57) ABSTRACT

A touchscreen driver circuit and a touch sensor display device are discussed. The touch sensor display device and the touch sensing method can improve touch sensitivity and improve touch sensitivity and the uniformity of a touch sensing signal while reducing the size of a circuit area.

16 Claims, 9 Drawing Sheets

TOUCH SCREEN DRIVER CIRCUIT AND TOUCH SENSOR DISPLAY DEVICE

CROSS-REFERENCE TO RELATED APPLICATION

This application claims priority to Korean Patent Application No. 10-2018-0157988, filed in the Republic of Korea on Dec. 10, 2018, which is hereby incorporated by reference for all purposes as if fully set forth herein.

BACKGROUND

Field

Embodiments of the present disclosure relate to a touchscreen driver circuit and a touch sensor display device.

Description of Related Art

With the development of multimedia, the importance of flat panel display devices has increased. In response thereto, flat panel display devices, such as liquid crystal display (LCD) devices, plasma display panels (PDPs), and organic light-emitting diode (OLED) display devices, have been introduced onto the market. Among such flat display devices, LCD devices are widely used as mobile flat display devices due to advantages thereof, such as excellent image quality, a thin profile, and low power consumption. In particular, LCD devices are variously used in notebook computers, computer monitors, televisions (TVs), and the like.

Touchscreen display devices respectively provided by stacking a touch panel on such an LCD device are widely used. When the touch panel is touched by a finger, a stylus pen, or the like, a touch point is detected on the basis of a change in electric characteristics, such as resistance or capacitance, of the touch point, so that information corresponding to the touch point can be output or operations relating to the touch point can be performed. The touchscreen display device is one type of user interface, and applications thereof are increasingly being applied to small portable terminals, office devices, mobile devices, and the like.

However, such a touchscreen display device, fabricated by stacking a separate touch panel on an LCD panel, has the following problems. The stacked touch panel can increase the thickness of the touchscreen display device, thereby making it difficult to design such a touchscreen display device to have a thinner profile. The transmission of light can be reduced by the stacked touch panel. In addition, fabrication costs can be increased. To overcome such problems, touch sensor display devices using advanced in-cell touch (AIT) technology have recently been proposed. In such a touch sensor display device, touch sensors are embedded in pixel areas thereof.

In touch sensor display devices having touch sensors embedded in pixel areas, touch sensors can be mounted on a display panel without increasing the thickness of the display panel. The touch sensor display device divides a display driving period, in which pixels are driven, and a touch driving period, in which touch sensors are driven, in a time division manner in order to reduce mutual influences due to coupling between pixels and touch sensors.

Here, a touch sensing signal is integrated using an amplifier circuit to improve touch sensitivity of the display panel and remove noise related to touch sensing, and a charge remover circuit for removing a charged voltage from the amplifier circuit is added in order to prevent the sensing signal in the amplifier circuit from being saturated.

However, it may be difficult to improve the uniformity of touch sensing signals using the amplifier circuit and the charge remover circuit for touch sensing signals. In addition, the charge remover circuit comprised of a plurality of capacitors may increase a circuit zone of the touch sensor display device, which is problematic.

BRIEF SUMMARY

Various aspects of the present disclosure provide a touchscreen driver circuit and a touch sensor display device able to improve touch sensitivity by controlling the polarity of a touch sensing signal.

Also the present disclosure provided are a touchscreen driver circuit and a touch sensor display device able to improve touch sensitivity and the uniformity of a touch sensing signal while reducing the size of a circuit area by including a touch signal amplifier circuit without a charge remover circuit.

According to an aspect, a touch sensor display device can include a display panel in which a plurality of gate lines, a plurality of data lines, a plurality of sensing lines, and a plurality of subpixels are arranged; a touch panel disposed within the display panel; a gate driver circuit disposed on a side of the display panel to drive the plurality of gate lines; a data driver circuit disposed on a side of the display panel, other than the side on which the gate driver circuit is disposed, to drive the plurality of data lines; a touchscreen driver circuit which is disposed on a side of the display panel, other than the side on which the gate driver circuit is disposed or the side on which the data driver circuit is disposed, to drive the plurality of sensing lines, including a polarity control circuit controlling a polarity of a touch sensing signal, transferred through the plurality of sensing lines, by dividing the touch sensing signal into a plurality of signals; an integrator circuit charging a voltage output from the polarity control circuit; and a sampling circuit generating a sensing output voltage by sampling the voltage charged in the integrator circuit; and a controller controlling signals applied to the gate driver circuit, the data driver circuit, and the touchscreen driver circuit.

The polarity control circuit can include a plurality of voltage followers dividing the touch sensing signal into the plurality of signals and transferring the divided signals to another element; and an inverting amplifier connected to a voltage follower among the plurality of voltage followers.

Each of the plurality of voltage followers can comprise an operational amplifier having a non-inverting input terminal, to which the touch sensing signal is applied, and an inverting input terminal, to which an output signal is fed back.

The inverting amplifier can be provided as an operational amplifier receiving the touch sensing signal, transferred through a first resistor, through an inverting input terminal thereof, with a second resistor being connected between the inverting input terminal of the operational amplifier and an output terminal, and a reference voltage being applied to a non-inverting input terminal of the operational amplifier.

The integrator circuit can include a plurality of switches, connected to the polarity control circuit, and at least one capacitor, such that the integrator circuit charges the capacitor with the voltage, output from the polarity control circuit, in response to the plurality of switches being manipulated.

The sampling circuit can include an operational amplifier having an inverting input terminal, to which an output terminal of the integrator circuit is connected, and a non-inverting input terminal, to which a reference voltage is applied; and a feedback capacitor and a reset switch connected between the inverting input terminal and an output terminal of the operational amplifier in parallel.

The touch sensor display device can further include a calibration circuit compensating for offsets according to the plurality of sensing lines or offset deviations regarding circuit elements within the touchscreen driver circuit.

The calibration circuit can feedback a threshold voltage of a transistor disposed in the display panel to the sensing output voltage, as a compensation value for calibration, according to the sensing lines.

The polarity control circuit can include a first polarity control circuit, to which the touch sensing signal in a rising interval of a touch driving signal is applied; and a second polarity control circuit, to which the touch sensing signal in a falling interval of the touch driving signal is applied.

The integrator circuit can include a first integrator circuit including a plurality of switches, connected to the first polarity control circuit, and at least one capacitor, to charge the capacitor with a voltage, output from the first polarity control circuit, in response to the plurality of switches being manipulated; and a second integrator circuit including a plurality of switches, connected to the second polarity control circuit, and at least one capacitor, to charge the capacitor of the second integrator circuit with a voltage, output from the second polarity control circuit, in response to the plurality of switches being manipulated.

The sampling circuit can include an operational amplifier receiving the voltage, output from the first integrator circuit, through an inverting input terminal thereof, and receiving the voltage, output from the second integrator circuit, through a non-inverting input terminal thereof; a feedback capacitor and a reset switch connected between the inverting input terminal and an output terminal of the OP amplifier in parallel; and a feedback capacitor and a reset switch connected between the non-inverting input terminal and the output terminal of the operational amplifier in parallel.

According to another aspect, provided is a touchscreen driver circuit in a touch sensor display device. The touch sensor display device includes a display panel in which a plurality of subpixels are arrayed, a gate driver circuit electrically connected to the display panel through a plurality of gate lines, a data driver circuit electrically connected to the display panel through a plurality of data lines, and a touchscreen driver circuit driving touch sensors in the display panel through a plurality of sensing lines. The touchscreen driver circuit can include a polarity control circuit controlling a polarity of a touch sensing signal, transferred through the plurality of sensing lines, by dividing the touch sensing signal into a plurality of signals; an integrator circuit charging a voltage output from the polarity control circuit; a sampling circuit generating a sensing output voltage by sampling the voltage charged in the integrator circuit.

According to exemplary embodiments, the touchscreen driver circuit and the touch sensor display device of the present disclosure can improve touch sensitivity by controlling the polarity of a touch sensing signal.

In addition, the touchscreen driver circuit and the touch sensor display device of the present disclosure can improve touch sensitivity and the uniformity of a touch sensing signal while reducing the size of a circuit area by including a touch signal amplifier circuit without a charge remover circuit.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
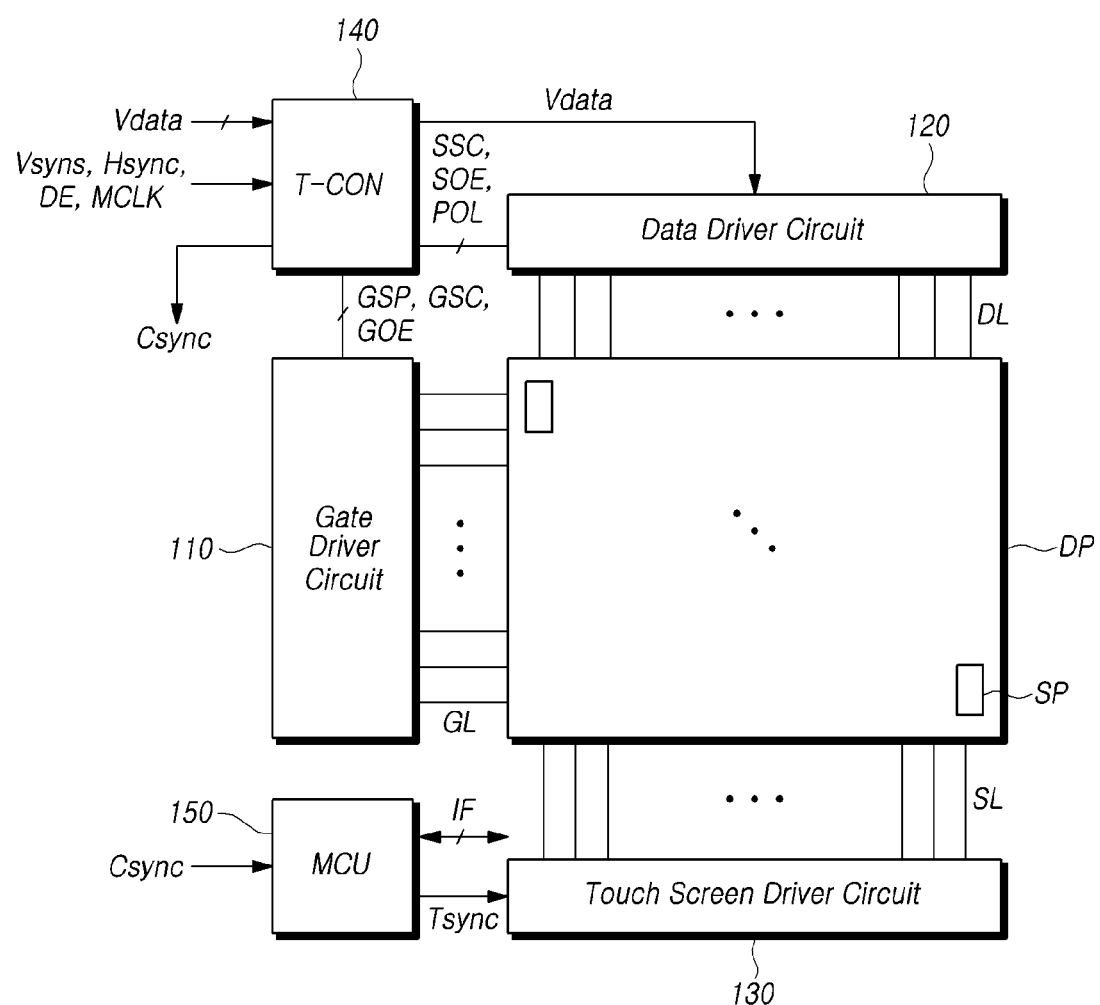
FIG. 1 is a block diagram illustrating a touch sensor display device according to embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it can make the subject matter of the present disclosure rather unclear.

The shapes, sizes, ratios, angles, numbers, and the like, inscribed in the drawings to illustrate exemplary embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the case that the subject matter of the present disclosure can be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

It will also be understood that, while terms, such as "first," "second," "A," "B," "(a)," and "(b)," can be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element. In the same context, it will be understood that when an element is referred to as being formed "on" or "under" another element, not only can it be directly located on or under the another element, but it can also be indirectly located on or under the another element via an intervening element.

In addition, terms, such as "first" and "second" can be used herein to describe a variety of components. It should be understood, however, that these components are not limited by these terms. These terms are merely used to discriminate one element or component from other elements or components. Thus, a first component referred to as first hereinafter can be a second component within the spirit of the present disclosure.

The features of exemplary embodiments of the present disclosure can be partially or entirely coupled or combined with each other and can work in concert with each other or can operate in a variety of technical methods. In addition, respective exemplary embodiments can be carried out independently or can be associated with and carried out in concert with other embodiments.

Hereinafter, embodiments of the present disclosure will be described in detail with reference to the accompanying drawings.

FIG. 1 is a block diagram illustrating a touch sensor display device according to embodiments. All the components of the touch sensor display device according to all embodiments of the present disclosure are operatively coupled and configured.

Referring to FIG. 1, the touch sensor display device according to embodiments can include a display panel DP, a gate driver circuit 110, a data driver circuit 120, a touch-screen driver circuit 130, a timing controller (T-CON) 140, and a micro control unit (MCU) 150.

The display panel DP displays an image on the basis of a scan signal SCAN transferred from the gate driver circuit 110 through gate lines GL and an image data Vdata transferred from the data driver circuit 120 through data lines DL. The display panel DP includes a liquid crystal layer provided between two substrates. The liquid crystal layer can be driven in any known mode, such as a twisted nematic (TN) mode, a vertical alignment (VA) mode, an in-plane switching (IPS) mode, or a fringe field switching (FFS) mode.

A plurality of subpixels SP of the display panel DP can be defined by a plurality of data lines DL and a plurality of gate lines GL. A single subpixel SP includes a thin-film transistor (TFT) provided in an area in which a single data line DL intersects a single gate line GL, a pixel electrode, such as an organic light-emitting diode (OLED), in which the image data Vdata is charged, a storage capacitor Cst electrically connected to the OLED to maintain the voltage, and the like.

A black matrix, a color filter, and the like, can be provided on the top substrate of the display panel DP, while TFTs, pixel electrodes, a common electrode, and the like, can be provided on the bottom substrate of the display panel DP. The display panel DP can be provided using a color-filter-on-TFT (COT) structure. In this case, the black matrix and the color filter can be provided on the bottom substrate of the display panel DP.

The common electrode, to which a common voltage Vcom is supplied, can be provided on the top substrate or the bottom substrate of the display panel DP. A polarizer is attached to each of the top substrate and the bottom substrate of the display panel DP, and alignment film for setting the tilt angle of liquid crystal molecules is provided on inner surfaces in contact with the liquid crystal molecules.

Column spacers for maintaining a cell gap of liquid crystal cells are provided between the top substrate and the bottom substrate of the display panel DP. A backlight unit is disposed below the bottom surface of the bottom polarizer of the display panel DP. The backlight unit can be implemented as an edge-type backlight unit or a direct-type backlight unit to illuminate the display panel DP.

Here, a touch panel can be provided as being embedded in a pixel array area of the display panel DP with an in-cell self-touch type. The touch panel with an in-cell self-touch scheme uses electrodes, provided within the display panel DP as blocks (or points), as touch sensors.

The timing controller 140 controls the gate driver circuit 110 and the data driver circuit 120. The timing controller 140 receives timing signals, such as a vertical synchronization signal Vsync, a horizontal synchronization signal Hsync, a data enable signal DE, and a main clock signal MCLK, as well as image data Vdata from a host system.

The timing controller 140 controls the gate driver circuit 110, on the basis of scan timing control signals, such as a gate start pulse signal GSP, a gate shift clock signal GSC, and a gate output enable signal GOE. In addition, the timing controller 140 controls the data driver circuit 120, on the basis of data timing control signals, such as a source sampling clock signal SSC, a polarity control signal POL, and a source output enable signal SOE.

The gate driver circuit 110 sequentially drives the plurality of gate lines GL by sequentially supplying the scan signal SCAN to the display panel DP through the plurality of gate lines GL. Herein, the gate driver circuit 110 can also be referred to as a scan driver circuit or a gate driver integrated circuit (GDIC).

The gate driver circuit 110 sequentially supplies the scan signal SCAN having an on or off voltage to the plurality of gate lines GL, under the control of the timing controller 140. In this regard, the gate driver circuit 110 can include a shift register, a level shifter, and the like.

The gate driver circuit 110 can be disposed on one side of the display panel DP (e.g., on or adjacent to a left or right portion of the display panel DP). In some cases, the gate driver circuit 110 can be disposed on both sides of the display panel DP (e.g., on or adjacent to left and right portions of the display panel DP).

Here, the data driver circuit 120 drives the plurality of data lines DL by supplying the image data Vdata, received from the timing controller 140, to the plurality of data lines DL. Herein, the data driver circuit 120 can also be referred to as a source driver circuit or a source driver integrated circuit (SDIC).

When a specific gate line GL is opened by the gate driver circuit 110, the data driver circuit 120 converts the image data Vdata, received from the timing controller 140, into an analog data voltage and supplies the analog data voltage to the plurality of data lines DL.

The data driver circuit 120 can be located on one side of the display panel DP (e.g., on or adjacent to the upper or lower portion of the display panel DP), or can be located on both sides of the display panel DP (on or adjacent to the upper and lower portions of the display panel DP), depending on the driving system, the design, or the like.

The data driver circuit 120 can include a shift register, a latch circuit, a digital-to-analog converter (DAC), an output buffer, etc. Herein, the digital-to-analog converter is a component for converting the image data Vdata, received from the timing controller 140, into an analog image data voltage to be supplied to the data lines DL.

The touchscreen driver circuit 130 detects a touch made on the display panel DP and detects a touch location on the surface of the display panel DP. The touchscreen driver circuit 130 includes a driving circuit for generating a driving voltage to drive touch sensors and a sensing circuit for generating data to sense the touch sensors and detect the touch, information regarding touch coordinates, and the like. The driving circuit and the sensing circuit of the touchscreen driver circuit 130 can be provided as a single integrated circuit (IC) or can be separated and divided according to function.

The touchscreen driver circuit 130 can be provided on an external substrate in contact with the display panel DP. The touchscreen driver circuit 130 is connected to the display panel DP via a plurality of sensing lines SL. The touchscreen driver circuit 130 can detect the touch and the touch location, on the basis of variations in capacitance among the touch sensors in the display panel DP. That is, a variation in capacitance occurs between a position touched by a finger of a user and a position not touched by the finger, and the touchscreen driver circuit 130 detects the touch and the touch location by detecting the variation in capacitance. The touch screen driver circuit 130 generates a touch sensing signal for sensing the presence and location of a touch and transmits the touch sensing signal to the micro control unit 150.

The micro control unit 150 controls the touchscreen driver circuit 130. The micro control unit 150 can receive a control synchronization signal Csync from the timing controller 140 and generate a touch synchronization signal Tsync, on the basis of the control synchronization signal Csync, control the touchscreen driver circuit 130. The micro control unit 150 transmits a touch sensing signal or the like to and receives a touch sensing signal or the like from the touchscreen driver circuit 130, using an interface defined therebetween.

Here, the micro control unit 150 can be combined with the touchscreen driver circuit 130 into a touch control circuit comprised of a single integrated circuit (IC), or can be combined with the timing controller 140 into a control circuit comprised of a single IC.

In addition, the touch sensor display device can further include a memory (MEM). The memory can temporarily store image data output from the timing controller 140, and can output the image data Vdata to the data driver circuit 120 at a preset timing. The memory can be disposed within or outside of the data driver circuit 120. In a case in which the memory is disposed outside of the data driver circuit 120, the memory can be disposed between the timing controller 140 and the data driver circuit 120. In addition, the memory can include a buffer memory to store the image data Vdata received from an external source and supply the stored image data Vdata to the timing controller 140.

In addition, the touch sensor display device can further include an interface for inputting and outputting signals to and from, or communications with, other external electronic devices or electronic components. For example, the interface can include at least one of a low-voltage differential signaling (LVDS) interface, a mobile industry processor interface (MIPI), serial interface, or a combination thereof.

Figure 2:
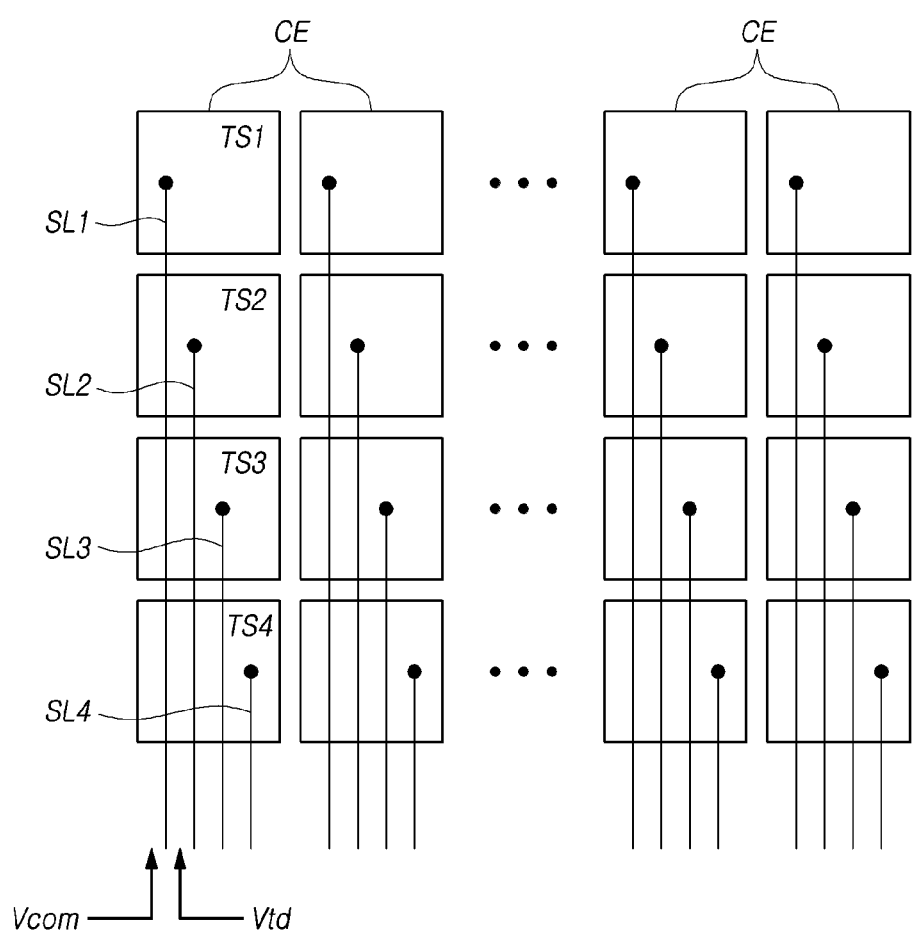
FIG. 2 is a block diagram illustrating touch sensors provided in the display panel of the touch sensor display device according to embodiments.

FIG. 2 is a block diagram illustrating touch sensors provided in the display panel of the touch sensor display device according to embodiments.

Referring to FIG. 2, the touch panel can be configured to be embedded in a pixel array area of the display panel DP, on the basis of an in-cell self-touch scheme. Here, the touch panel based on the in-cell self-touch scheme can use a common electrode CE provided within the display panel DP as blocks or points, as touch sensors TS.

In the touch panel based on the in-cell self-touch scheme, a segment of the common electrode CE, included in some of the plurality of subpixels SP provided within the display panel DP, forms a single touch sensor TS. The touch sensors TS can be defined by the divided segments of the common electrode CE in the display panel DP.

The plurality of touch sensors TS can be arrayed in rows and columns within an active area of the display panel DP. Each of the touch sensors TS can be connected to a sensing line SL, through which a touch sensing signal is transferred.

Figure 3:
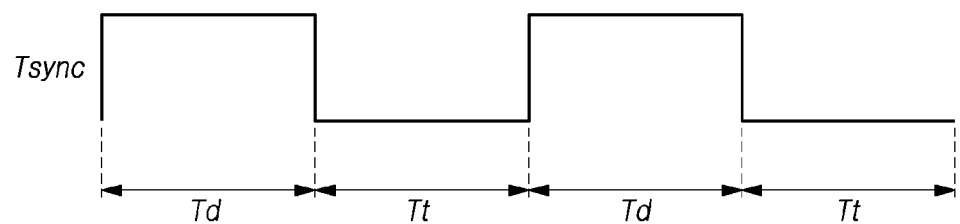
FIG. 3 is a signal flow diagram illustrating timing division driving of the in-cell self-touch scheme in the touch sensor display device according to embodiments.

FIG. 3 is a signal flow diagram illustrating timing division driving of the in-cell self-touch scheme in the touch sensor display device according to embodiments.

Referring to FIG. 3, in the touch sensor display device based on the in-cell self-touch scheme, a display driving period Td, in which an image is displayed on the display panel DP, and a touch driving period (or touchscreen driving period) Tt, in which the display panel DP is sensed, can be divided in a time division manner. Thus, the touch sensor display device is driven in the display driving period Td and the touch driving period Tt in a time division manner.

The touchscreen driver circuit 130 applies a touch driving signal Vtd to the display panel DP through the sensing lines SL connected therebetween. During the touch driving period Tt, the touch driving signal Vtd can be supplied to the sensing lines SL, so that a touch sensing signal can be input through the touch sensors TS. During the display driving period Td, a common voltage Vcom can be supplied to the sensing lines SL, so that an image can be displayed on the display panel DP. Here, the time division between the display driving period Td and the touch driving period Tt can be enabled by a touch synchronization signal Tsync.

Figure 4:
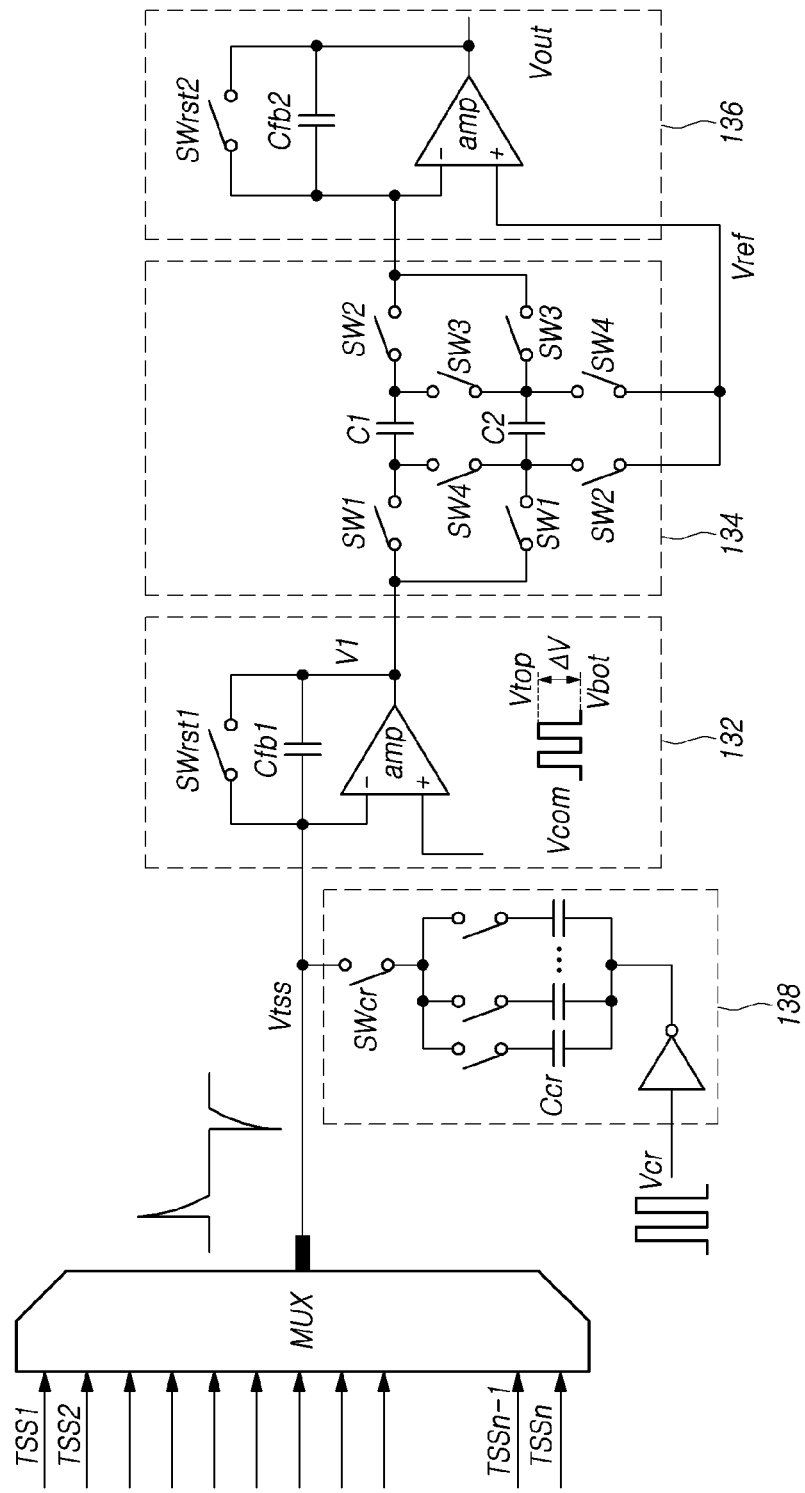
FIG. 4 is a circuit diagram illustrating a touchscreen driver circuit of a touch sensor display device.

FIG. 4 is a circuit diagram illustrating a touchscreen driver circuit of a touch sensor display device.

Referring to FIG. 4, the touchscreen driver circuit 130 can perform touch sensing using switched-capacitor circuits by a charge transferring method. The touchscreen driver circuit 130 can include a multiplexer MUX, a preamplifier circuit 132, an integrator circuit 134, a sampling circuit 136, and a charge remover circuit 138. An analog-to-digital converter (ADC) for converting a touch sensing signal into a digital value can be connected to an output terminal of the sampling circuit 136.

A touch sensing signal TSS, transferred from the plurality of sensing lines SL connected to the display panel DP, is transferred to the touchscreen driver circuit 130 via the multiplexer MUX.

The preamplifier circuit 132 can include an operational amplifier (OP amp), a feedback capacitor Cfb1, and a reset switch SWrst1. The operational amplifier receives a touch sensing voltage Vtss, corresponding to the touch sensing signal TSS, through an inverting input terminal. The feedback capacitor Cfb1 is connected between a non-inverting input terminal and an output terminal of the operational amplifier in parallel. A common voltage Vcom, changing between a high level Vtop and a low level Vbot according to the frequency, can be applied to the non-inverting input terminal of the operational amplifier. An output voltage V1 of the preamplifier circuit 132 is applied to an integrator circuit 134.

Here, when the common voltage Vcom in the form of a pulse is applied to the preamplifier circuit 132, the output voltage V1 of the preamplifier circuit 132 can vary, depending on whether or not a finger (or a stylus pen) has touched the display panel DP.

The integrator circuit 134 can include a plurality of switches SW1, . . . , and SW4 and a plurality of capacitors C1 and C2, and can be modified into a variety of structures. Due to the structure of the integrator circuit 134, the output voltage V1 of the preamplifier circuit 132 is accumulated in the capacitors C1 and C2, according to the number of pulses of the common voltage Vcom applied.

The sampling circuit 136 can include an operational amplifier, a feedback capacitor Cfb2, and a reset switch SWrst2. The operational amplifier has an inverting input terminal, to which an output line of the integrator circuit 134 is connected, and a non-inverting input terminal, to which a reference voltage Vref is applied. The feedback capacitor Cfb2 is connected between the inverting input terminal and an output terminal of the operational amplifier in parallel. The voltage, accumulated in the capacitors C1 and C2 of the integrator circuit 134, can charge the feedback capacitor Cfb2, so that the voltage can be transferred to the analog-to-digital converter (ADC) as a sensing output voltage Vout.

Here, the touchscreen driver circuit 130 can include the charge remover circuit 138 to remove initial charge remaining in the inverting input terminal of the preamplifier circuit 132. With increases in the capacitance of the touch sensors TS as in the case of a large-screen display panel, the output voltage V1 of the preamplifier circuit 132 can be increased. Consequently, the voltage in the touchscreen driver circuit 130 can exceed an allowable range and be saturated. In this case, it is difficult to determine a touch input, since an output voltage in a touched state of the display panel DP can be the same as, or substantially the same as, an output voltage of the display panel DP in a non-touched state. To solve this problem, the charge remover circuit 138 can be connected to a front end of the preamplifier circuit 132.

The charge remover circuit 138 has a structure, comprised of a plurality of capacitors Ccr connected in parallel, to which a charge-removing pulse voltage Vcr is applied. Due to the charge remover circuit 138 being disposed in each of channels, the size of the circuit area of the touch sensor display device is increased, and the number of the capacitors Ccr used is increased by the size of the charge to be compensated for. Accordingly, a high-power charge-removing pulse voltage Vcr is required, which is problematic.

The present disclosure provides a touchscreen driver circuit able to improve touch sensitivity by controlling the polarity of the touch sensing signal TSS transferred from the display panel DP, and a touch sensor display device including the touchscreen driver circuit. In particular, when a single position of the display panel DP is simultaneously touched by both a finger and a stylus pen, the touches can be separately processed, depending on the polarity, or touch sensitivity regarding a pen touch signal having a relatively lower intensity can be improved.

Figure 5:
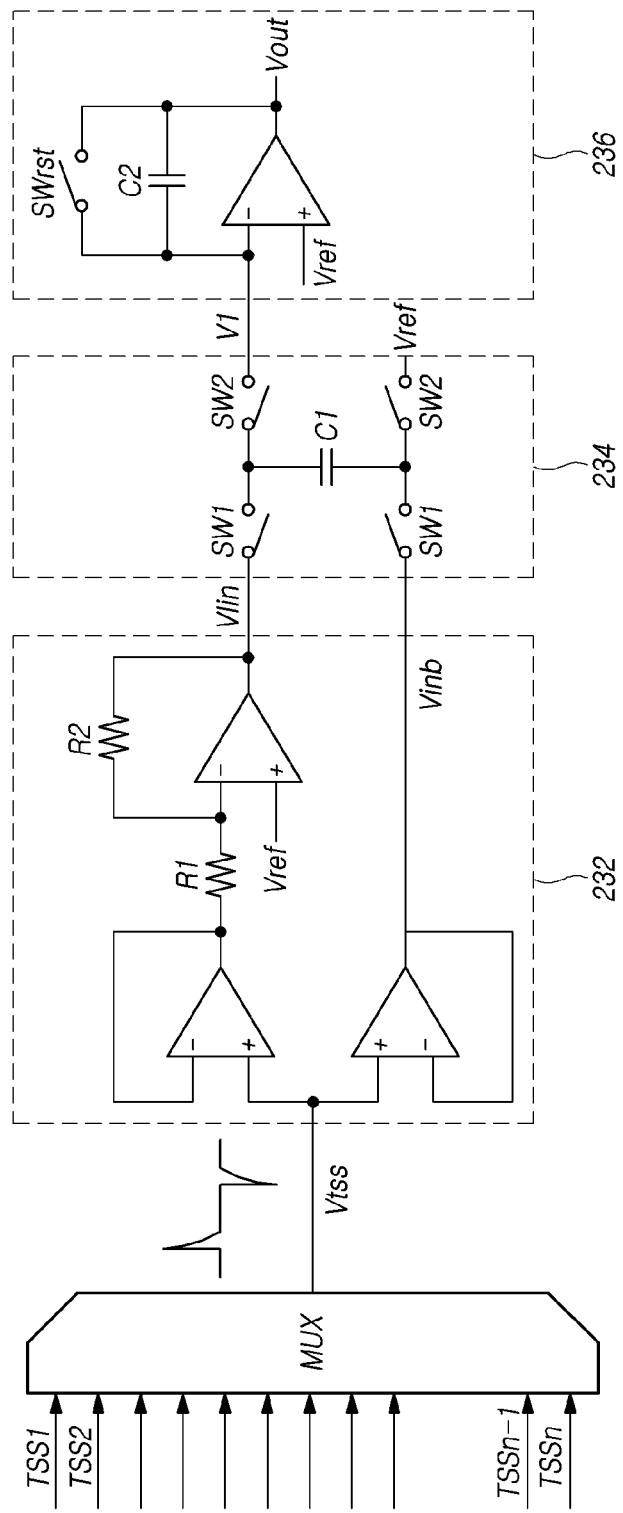
FIG. 5 is a circuit diagram illustrating a touchscreen driver circuit of the touch sensor display device according to embodiments.

FIG. 5 is a circuit diagram illustrating a touchscreen driver circuit 130 of the touch sensor display device according to embodiments.

Referring to FIG. 5, the touchscreen driver circuit 130 according to embodiments can include a polarity control circuit 232, an integrator circuit 234, and a sampling circuit 236. A digital-to-analog converter for converting a sensing output voltage Vout into a digital value can be connected to an output terminal of the sampling circuit 236.

A touch sensing voltage Vtss, transferred from the plurality of sensing lines SL connected to the display panel DP, is transferred to the touchscreen driver circuit 130 via a multiplexer MUX. The touch sensing voltage Vtss can be a positive pitch signal or a negative pitch signal, depending on whether an input means is a finger or an electronic device, such as a stylus pen, or whether an input is a touch input or a hovering input. Here, the touch sensing voltage Vtss having different polarities is accumulated, the magnitude thereof can be canceled, so that touch sensing may not be properly performed or an error can occur in touch sensing. Accordingly, the touch sensor display device according to embodiments can convert the touch sensing signal TSS into a unidirectional polarity signal using the polarity control circuit 232 and accumulate the unidirectional polarity signal, so that the touch sensing can be effectively performed.

The polarity control circuit 232 can include a two-stage voltage follower for dividing the touch sensing voltage Vtss into two signals and transferring the divided signals to downstream elements and an inverting amplifier connected to one voltage follower circuit of the two-stage voltage follower.

The two-stage voltage follower can have a structure comprised of operational amplifiers connected in parallel. In each of the operational amplifiers, the touch sensing voltage Vtss is applied to a non-inverting input terminal and an output signal is fed back to an inverting input terminal. Here, the first stage voltage follower transfers the touch sensing voltage Vtss to the inverting amplifier through a first resistor R1, while the second stage voltage follower outputs the touch sensing voltage Vtss (Vinb) as it is.

The inverting amplifier receives the touch sensing voltage Vtss, transferred through the first resistor R1, using the inverting input terminal, with a second resistor R2 being connected between the inverting input terminal and an output terminal thereof. In addition, a reference voltage Vref is applied to a non-inverting input terminal of the inverting amplifier. The reference voltage Vref can be a ground voltage, and can be set to be an average of a high level and a low level of the touch driving signal Vtd. Here, the gain of the inverting amplifier can be −(R2/R1), and thus, an output voltage Vin can be a signal having a polarity opposite to that of the touch sensing voltage Vtss. If the first resistor R1 and the second resistor R2 are equivalent, the output voltage Vin of the inverting amplifier can be a signal having the same magnitude as but an opposite polarity to the touch sensing voltage Vtss. As a result, the polarity control circuit 232 divides the touch sensing voltage Vtss into the non-polarity reversal signal Vinb and the polarity reversal signal Vin, which are simultaneously output.

Since the two-stage voltage follower as described above serves to transfer the touch sensing voltage Vtss, the two-stage voltage follower can be omitted as required.

The integrator circuit 234 can include a plurality of switches SW1 and SW2, connected to the polarity control circuit 232, and a capacitor C1. Here, the number and position of the switches and the capacitors of the integrator circuit 234 can be variously changed, so that the output voltages Vin and Vinb of the polarity control circuit 232 can be accumulatively charged. In the structure illustrated by way of example herein, the first switches SW1 are connected to the output terminal of the polarity control circuit 232, respectively, the second switches SW2 are connected to input terminals of the sampling circuit 236, respectively, and the capacitor C1 is connected between the switches SW1 and SW2, so that the output voltages Vin and Vinb of the polarity control circuit 232 can be simultaneously charged and discharged.

Thus, in an interval in which the first switches SW1 are turned on, the capacitor C1 can be charged with the output voltages Vin and Vinb of the polarity control circuit 232. In an interval in which the second switches SW2 are turned on, electric charges can be transferred from the capacitor C1 to the sampling circuit 236.

The sampling circuit 236 can include an operational amplifier, a feedback capacitor C2, and a reset switch SWrst. The operational amplifier has an inverting input terminal, to which an output line of the integrator circuit 234 is connected, and a non-inverting input terminal, to which the reference voltage Vref is applied. The feedback capacitor C2 is connected between the inverting input terminal and an output terminal of the operational amplifier in parallel. With the second switches SW2 being in a turned-off state, the voltage, accumulated in the capacitor C1 of the integrator circuit 234, can charge the feedback capacitor C2 of the sampling circuit 236, so that the voltage can be transferred to the analog-to-digital converter as a sensing output voltage Vout.

The sensing output voltage Vout, transferred to the analog-to-digital converter, from the touchscreen driver circuit 130 according to embodiments can be calculated using formulas as follows.

First, according to the law of conservation of charge, the quantity of electric charge in the capacitor C1 of the integrator circuit 234 can be the same as the quantity of electric charge in the capacitor C2 of the sampling circuit 236. Here, when the quantity of electric charge in the capacitor C1 of the integrator circuit 234 is indicated as Q1 and the quantity of electric charge in the capacitor C2 of the sampling circuit 236 is indicated as Q2, the formula Q1 (SW2=High)−Q1 (SW1=High)=Q2 (SW2=High)−Q2 (SW1=High) can be obtained, since a variation in the quantity of electric charge Q1 of the capacitor C1 of the integrator circuit 234 is the same as a variation in the quantity of electric charge Q2 of the feedback capacitor C2 of the sampling circuit 236 according to the phases of the first switches SW1 and the second switches SW2.

Here, with the second switches SW2 being at a high level, the same reference voltage Vref is applied to the inverting input terminal and the non-inverting input terminal of the operational amplifier of the sampling circuit 236, due to a virtual short-circuit of the OP amplifier. Thus, in a state in which both terminals of the capacitor C1 of the integrator circuit 234 have the same voltage, when the first switches SW1 and the reset switch SWrst are at a high level, both terminals of the feedback capacitor C2 of the sampling circuit 236 have the same voltage.

This can be expressed by the formula: C1 (Vref−Vref)−C1 (Vinb−Vin)=C2 (Vref−Vout)−C2 (Vout−Vout). Arranging this can be expressed as Vout=(Vinb−Vin)C1/C2+Vref.

Figure 6A:
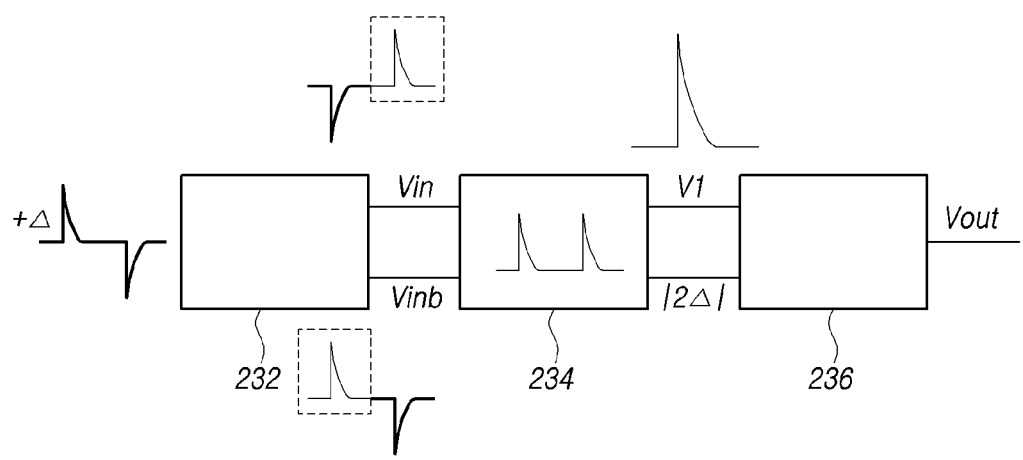
FIGS. 6A and 6B are signal flow diagrams illustrating a touch sensing operation in the touch sensor display device according to embodiments.
Figure 6B:
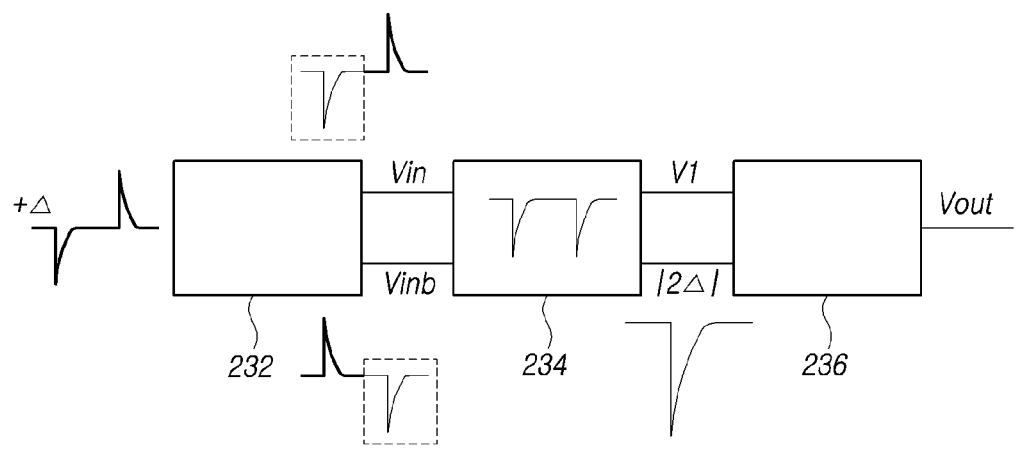

FIGS. 6A and 6B are signal flow diagrams illustrating a touch sensing operation in the touch sensor display device according to embodiments.

The touch sensing voltage Vtss can be alternately or irregularly generated as a positive-direction touch sensing signal and a negative-direction touch sensing signal. Here, the touch sensing voltage Vtss can have a magnitude Δ in a positive direction or a negative direction. FIG. 6A illustrates an example in which the positive-direction touch sensing voltage Vtss is applied before the negative-direction touch sensing voltage Vtss is applied.

The touch sensing voltage Vtss having the magnitude Δ is generated as two types of output signals, i.e., a polarity reversal signal Vin and a non-polarity reversal signal Vinb, from the polarity control circuit 232.

Regarding the two types of output signals Vin and Vinb, transferred from the polarity control circuit 232, a signal having the same polarity can be consecutively transferred by controlling the switches in the integrator circuit 234. In a case in which the signal having the same polarity is charged in the capacitor of the integrator circuit 234, the voltage charged in the capacitor can be accumulated to be a multiple, such as two or three times, of the magnitude Δ of the initial touch sensing voltage Vtss. According to this example, the same-polarity touch sensing voltage Vtss having the magnitude Δ is accumulated in the integrator circuit 234 two times, so that a signal V1, the magnitude 2Δ of which is twice the magnitude Δ, is transferred to the sampling circuit 236.

The signal V1, transferred to the sampling circuit 236, can be charged in the capacitor of the sampling circuit 236, so that a sensing output voltage Vout can be transferred to the analog-to-digital converter ADC at a sampling timing.

In contrast, FIG. 6B illustrates an example in which the negative-direction touch sensing voltage Vtss is applied before the positive-direction touch sensing voltage Vtss is applied. It can also be regarded that the magnitude of the touch sensing voltage Vtss is Δ.

In the same manner, the touch sensing voltage Vtss is generated as two types of output signals, i.e., a polarity reversal signal Vin and a non-polarity reversal signal Vinb, from the polarity control circuit 232. In addition, regarding the two types of output signals Vin and Vinb, transferred from the polarity control circuit 232, a signal having the same polarity can be consecutively transferred by controlling the switches in the integrator circuit 234. Here, the negative-direction touch sensing voltage Vtss can be consecutively charged in the capacitor of the integrator circuit 234, so that the negative-direction touch sensing voltage Vtss, the magnitude of which is two times 2Δ or three times 3Δ the magnitude Δ of the initial touch sensing voltage Vtss, can be accumulated in the integrator circuit 234.

The signal V1, transferred from the integrator circuit 234, can be charged in the capacitor of the sampling circuit 236, so that a sensing output voltage Vout can be transferred to the analog-to-digital converter ADC at the sampling timing.

As a result, the touch sensor display device according to embodiments can increase the accumulated voltage of the touch sensing signal TSS of the display panel DP by converting the opposite polarities of the signal into the same polarity and accumulating the same-polarity signal. Accordingly, it is possible to effectively improve touch sensitivity without additionally disposing the charge remover (CR) circuit.

In addition, in a touch sensor display device having a large screen or a high level of load, touch sensitivity is required to be maintained to be uniform, since the touch sensors TS are disposed in the display panel DP across a wide area.

Here, offsets according to the sensing lines SL of the display panel DP, offsets of the OP amplifiers and the feedback capacitor C2 in the touchscreen driver circuit 130, and offset characteristics of the analog-to-digital converter can be reflected on the sensing output voltage Vout of the sampling circuit 236. Such offsets can occur since a reference level differs due to amplifier mismatch and process variation. Accordingly, it is necessary to compensate for a deviation due to offset (or an offset deviation) using a uniform reference value.

Figure 7:
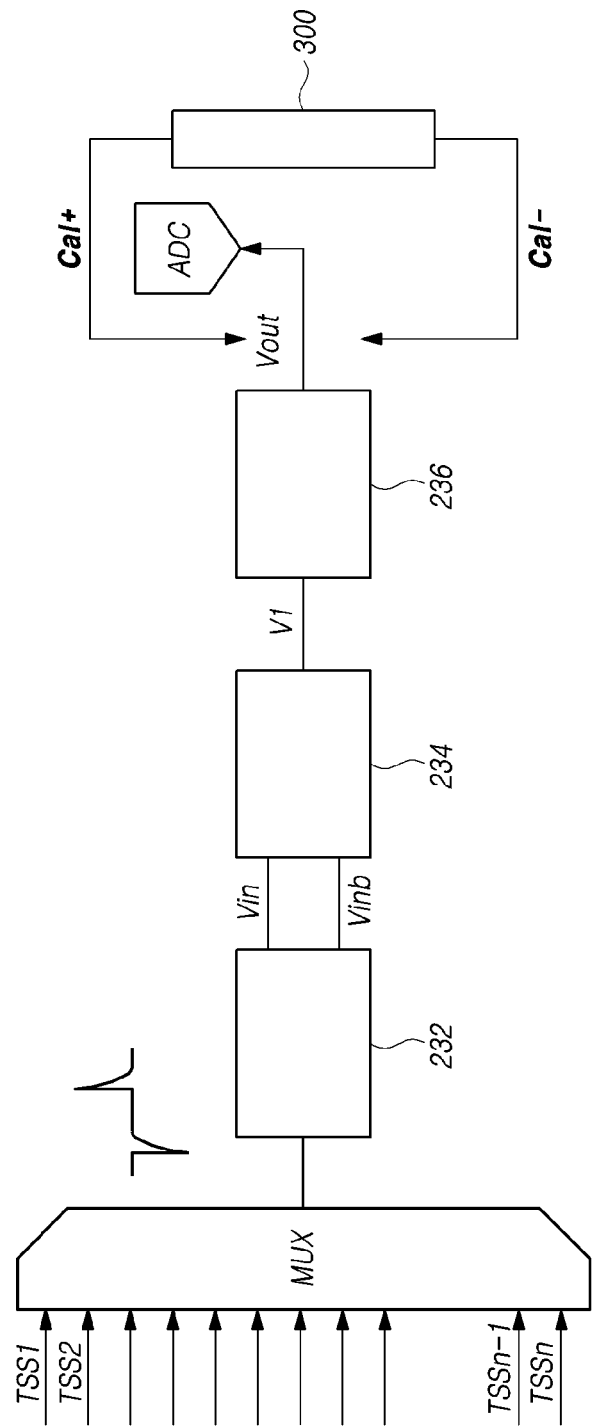
FIG. 7 is a block diagram illustrating a process of compensating for an offset deviation of the touchscreen driver circuit by a calibration circuit in the touch sensor display device according to embodiments.

FIG. 7 is a block diagram illustrating a process of compensating for an offset deviation of the touchscreen driver circuit by a calibration circuit in the touch sensor display device according to embodiments.

Referring to FIG. 7, the touch sensor display device according to embodiments can include a calibration circuit 300 provided in the touchscreen driver circuit 130.

The calibration circuit 300 is intended to compensate for offsets according to the sensing lines SL of the display panel DP or offset deviations regarding circuit elements within the touchscreen driver circuit 130. The compensation process by the calibration circuit 300 can be performed in a power-off sequence period under the control of the micro control unit 150. The calibration circuit 300 can obtain sensing data for calibration by applying a test current to the touchscreen driver circuit 130 in a calibration mode, and can calculate a compensation value for calibration, by which an offset deviation of the touchscreen driver circuit 130 can be compensated for, on the basis of the sensing data for calibration.

Alternatively, a compensation value for calibration can be calculated using a compensation reference value determined in consideration of characteristics according to the sensing lines SL of the display panel DP or characteristics of the amplifiers. For example, the sensing lines SL of the display panel DP can have unique parasitic capacitance or unique parasitic resistance, which can correspond to a threshold voltage Vth of a transistor disposed in each of the subpixels SP. Accordingly, the calibration circuit 300 can compensate for an offset deviation by feedbacking compensation values for calibration Cal+ and Cal−, obtained by adjusting a sensing output voltage Vout of the touchscreen driver circuit 130 by the threshold voltage of the transistor, to the sensing output voltage Vout of the touchscreen driver circuit 130. Although not shown, the compensation values for calibration Cal+ and Cal− can be transferred, at an analog signal level, to the touchscreen driver circuit 130 through a digital-to-analog converter (DAC).

In addition, the touch sensor display device according to embodiments can be applied in the same manner in a differential mode in which a difference between touch data regarding the touch, made on the display panel DP, and non-touch data indicating that no touch has been performed is integrated.

Figure 8:
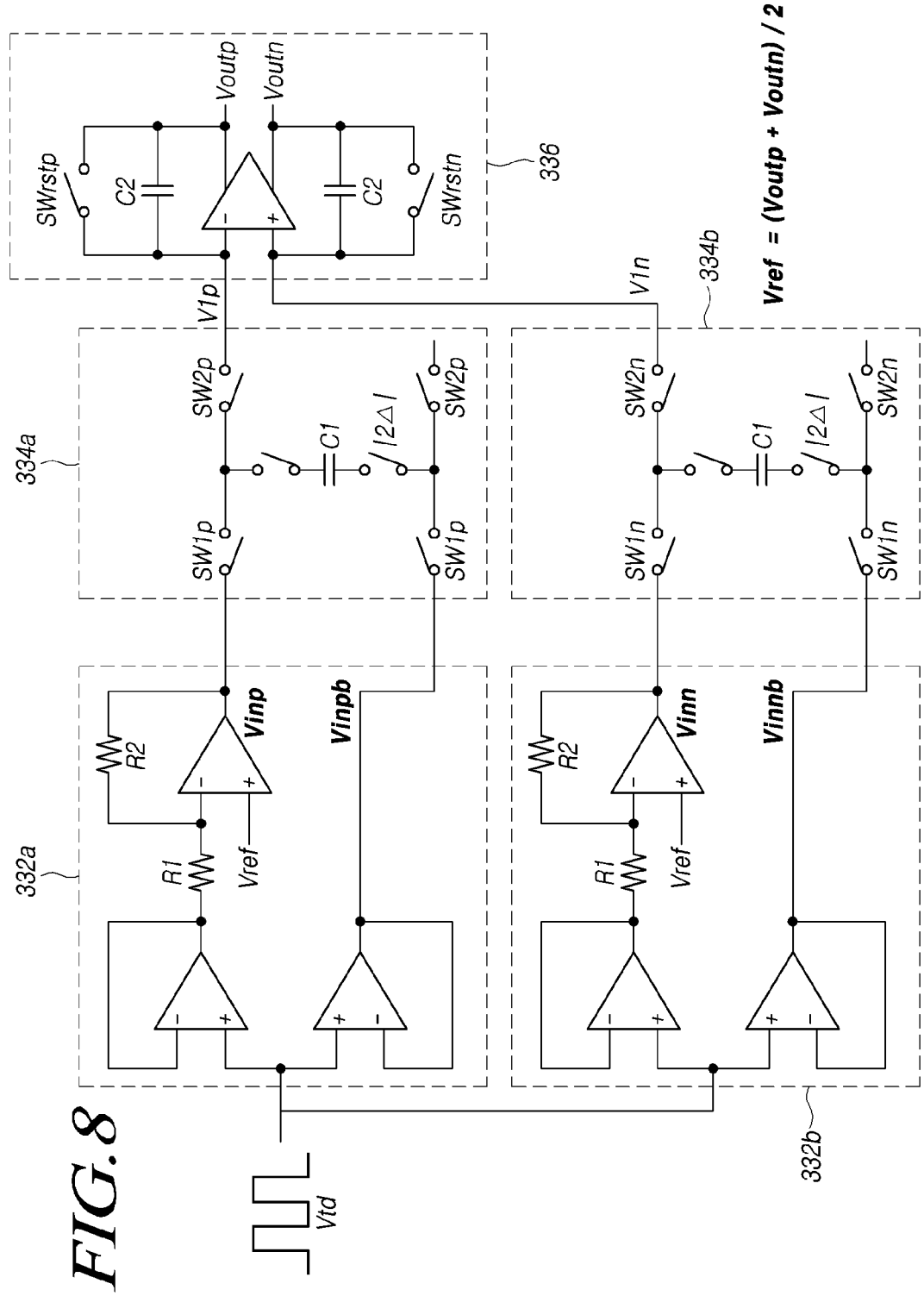
FIG. 8 is circuit diagram illustrating a touchscreen driver circuit in a differential mode in the touch sensor display device according to embodiments.

FIG. 8 is circuit diagram illustrating a touchscreen driver circuit in a differential mode in the touch sensor display device according to embodiments.

Referring to FIG. 8, in a case in which the differential mode is applied to the touch sensor display device according to embodiments, the touch sensing signal TSS can be sampled in each of a rising interval and a falling interval of the touch driving signal Vtd applied to the touch sensors TS of the display panel DP.

In this regard, the touchscreen driver circuit 130 according to embodiments can include a first polarity control circuit 332a and a first integrator circuit 334a for touch sensing in the rising interval of the touch driving signal Vtd, a second polarity control circuit 332b and a second integrator circuit 334b for touch sensing in the falling interval of the touch driving signal Vtd, and a differential sampling circuit 336 comparing an output voltage of the first integrator circuit 334a and an output voltage of the second integrator circuit 334b.

The first polarity control circuit 332a and the first integrator circuit 334a are the same as the polarity control circuit 332 and the integrator circuit 334 illustrated in FIG. 5. The touch driving signal Vtd can be applied to a non-inverting input terminal of an operational amplifier of the first polarity control circuit 332a.

In addition, the second polarity control circuit 332b and the second integrator circuit 334b are the same as the polarity control circuit 332 and the integrator circuit 334 illustrated in FIG. 5. The touch driving signal Vtd can be applied to a non-inverting input terminal of an operational amplifier of the second polarity control circuit 332b.

The operational amplifier of the differential sampling circuit 336 can receive an output voltage V1p of the first integrator circuit 334a using the inverting input terminal and an output voltage V1n using the non-inverting input terminal. A feedback capacitor C2 and a reset switch SWrstp can be connected between the inverting input terminal and the output terminal of the OP amplifier in parallel. A feedback capacitor C2 and a reset switch SWrstn can be connected between the non-inverting input terminal and the output terminal of the operational amplifier.

With a second switch SW2p of the first integrator circuit 334a being turned on, the voltage V1p, accumulated in the capacitor C1 of the first integrator circuit 334a, is charged in the feedback capacitor C2 of the differential sampling circuit 336, and then is output as a first sensing output voltage Voutp.

With a second switch SW2n of the second integrator circuit 334b being turned on, the voltage V1n, accumulated in the capacitor C1 of the second integrator circuit 334b, is charged in the feedback capacitor C2 of the differential sampling circuit 336, and then is output as a second sensing output voltage Voutn.

Accordingly, the differential sampling circuit 336 applies a difference between the first sensing output voltage Voutp, sensed in the rising interval of the touch driving signal Vtd, and the second sensing output voltage Voutn, sensed in the falling interval of the touch driving signal Vtd, to an analog-to-digital converter (ADC).

A sensing output voltage Vout of the sampling circuit 336 can be calculated by the same method as in FIG. 5. The sensing output voltage Vout can be expressed by the formulas:

$$Voutp=-(Vinpb-Vinp)C1/C2,$$

$$Voutn=-(Vinnb-Vinn)C1/C2, \text{ and}$$

$$Vout=-[(Vinpb-Vinp)-(Vinnb-Vinn)]+Vref$$

Here, a reference voltage can be (Voutp+Voutn)/2, i.e., an average of the first sensing output voltage Voutp and the second sensing output voltage Voutn.

As set forth above, the touch sensor display device according to embodiments can improve touch sensing sensitivity by converting the opposite polarities of the touch sensing signal TSS into the same polarity and accumulating the same-polarity signal even in the differential mode in which the touch driving signal Vtd of the display panel DP is used. Accordingly, it is possible to effectively improve touch sensitivity without additionally providing a charge remover circuit in the touch sensor display device.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch sensor display device comprising:
   a display panel in which a plurality of gate lines, a plurality of data lines, a plurality of sensing lines, and a plurality of subpixels are arranged;
   a touch panel disposed within the display panel;
   a gate driver circuit disposed on a side of the display panel to drive the plurality of gate lines;
   a data driver circuit disposed on a side of the display panel to drive the plurality of data lines;
   a touchscreen driver circuit disposed on a side of the display panel to drive the plurality of sensing lines,
   wherein the touchscreen driver circuit includes:
      a polarity control circuit configured to control a polarity of a touch sensing signal, transferred through the plurality of sensing lines, by dividing the touch sensing signal into a plurality of signals,
      an integrator circuit configured to charge a voltage output from the polarity control circuit, and
      a sampling circuit configured to generate a sensing output voltage by sampling the voltage charged in the integrator circuit; and
   a controller configured to control signals applied to the gate driver circuit, the data driver circuit, and the touchscreen driver circuit,
   wherein the polarity control circuit includes:
      a plurality of voltage followers dividing the touch sensing signal into the plurality of signals and transferring the plurality of signals to the integrator circuit; and
      an inverting amplifier connected to one of the plurality of voltage followers,
   wherein each of the plurality of voltage followers comprises:
      an operational amplifier having a non-inverting input terminal receiving the touch sensing signal, which is equally applied to respective operational amplifiers of the plurality of voltage followers, and an inverting input terminal, to which an output signal of the operational amplifier is fed back.

2. The touch sensor display device according claim 1, wherein the operational amplifier of the inverting amplifier receives the touch sensing signal, transferred through a first resistor, through an inverting input terminal thereof, with a second resistor being connected between the inverting input terminal of the inverting amplifier and an output terminal, and a reference voltage being applied to a non-inverting input terminal of the inverting amplifier.

3. The touch sensor display device according to claim 1, wherein the integrator circuit includes:
   a plurality of switches, connected to the polarity control circuit, and
   at least one capacitor, so that the integrator circuit charges the capacitor with the voltage, output from the polarity control circuit, in response to the plurality of switches being manipulated.

4. The touch sensor display device according to claim 1, wherein the sampling circuit includes:
   an operational amplifier having an inverting input terminal, to which an output terminal of the integrator circuit is connected, and a non-inverting input terminal, to which a reference voltage is applied; and
   a feedback capacitor and a reset switch connected between the inverting input terminal and an output terminal of the operational amplifier in parallel.

5. The touch sensor display device according to claim 1, further comprising:
   a calibration circuit compensating for offsets according to the plurality of sensing lines or offset deviations regarding circuit elements within the touchscreen driver circuit.

6. The touch sensor display device according to claim 5, wherein the calibration circuit feedbacks a threshold voltage of a transistor disposed in the display panel to the sensing output voltage, as a compensation value for calibration, according to the sensing lines.

7. The touch sensor display device according to claim 1, wherein the polarity control circuit includes:
   a first polarity control circuit to which the touch sensing signal in a rising interval of a touch driving signal is applied; and
   a second polarity control circuit to which the touch sensing signal in a falling interval of the touch driving signal is applied.

8. The touch sensor display device according to claim 7, wherein the integrator circuit includes:
   a first integrator circuit including a plurality of first switches, connected to the first polarity control circuit, and at least one first capacitor, to charge the first capacitor with a voltage, output from the first polarity control circuit, in response to the plurality of first switches being manipulated; and
   a second integrator circuit including a plurality of second switches, connected to the second polarity control circuit, and at least one second capacitor, to charge the second capacitor of the second integrator circuit with a voltage, output from the second polarity control circuit, in response to the plurality of second switches being manipulated.

9. The touch sensor display device according to claim 8, wherein the sampling circuit includes:
   an operational amplifier receiving the voltage, output from the first integrator circuit, through an inverting input terminal thereof, and receiving the voltage, output from the second integrator circuit, through a non-inverting input terminal thereof;
   a feedback capacitor and a reset switch connected between the inverting input terminal and an output terminal of the operational amplifier in parallel; and
   a feedback capacitor and a reset switch connected between the non-inverting input terminal and the output terminal of the operational amplifier in parallel.

10. A touchscreen driver circuit in a touch sensor display device including a display panel in which a plurality of subpixels are arranged, a gate driver circuit electrically connected to the display panel through a plurality of gate lines, a data driver circuit electrically connected to the display panel through a plurality of data lines, the touchscreen driver circuit configured to drive touch sensors in the display panel through a plurality of sensing lines, the touchscreen driver circuit comprising:
   a polarity control circuit configured to control a polarity of a touch sensing signal, transferred through the plurality of sensing lines, by dividing the touch sensing signal into a plurality of signals;
   an integrator circuit configured to charge a voltage output from the polarity control circuit; and
   a sampling circuit configured to generate a sensing output voltage by sampling the voltage charged in the integrator circuit, wherein the polarity control circuit includes:
- a plurality of voltage followers configured to divide the touch sensing signal into the plurality of signals, and transfer the plurality of signals to the integrator circuit; and
- an inverting amplifier connected to one of the plurality of voltage followers, wherein each of the plurality of voltage followers comprises:
- an operational amplifier having a non-inverting input terminal receiving the touch sensing signal, which is equally applied to respective operational amplifiers of the plurality of voltage followers, and an inverting input terminal, to which an output signal of the operational amplifier is fed back.

11. The touchscreen driver circuit according to claim 10, wherein the operational amplifier of the inverting amplifier receives the touch sensing signal, transferred through a first resistor, through an inverting input terminal thereof, with a second resistor being connected between the inverting input terminal of the inverting amplifier and an output terminal, and a reference voltage being applied to a non-inverting input terminal of the inverting amplifier.

12. The touchscreen driver circuit according to claim 10, wherein the integrator circuit includes:
- a plurality of switches, connected to the polarity control circuit, and
- at least one capacitor, so that the integrator circuit charges the capacitor with the voltage, output from the polarity control circuit, in response to the plurality of switches being manipulated.

13. The touchscreen driver circuit according to claim 10, wherein the sampling circuit includes:
- an operational amplifier having an inverting input terminal to which an output terminal of the integrator circuit is connected, and a non-inverting input terminal to which a reference voltage is applied; and
- a feedback capacitor and a reset switch connected between the inverting input terminal and an output terminal of the operational amplifier in parallel.

14. The touchscreen driver circuit according to claim 10, wherein the polarity control circuit includes:
- a first polarity control circuit to which the touch sensing signal in a rising interval of a touch driving signal is applied; and
- a second polarity control circuit to which the touch sensing signal in a falling interval of the touch driving signal is applied.

15. The touchscreen driver circuit according to claim 14, wherein the integrator circuit includes:
- a first integrator circuit including a plurality of first switches, connected to the first polarity control circuit, and at least one first capacitor, to charge the first capacitor with a voltage, output from the first polarity control circuit, in response to the plurality of first switches being manipulated; and
- a second integrator circuit including a plurality of second switches, connected to the second polarity control circuit, and at least one second capacitor, to charge the second capacitor of the second integrator circuit with a voltage, output from the second polarity control circuit, in response to the plurality of second switches being manipulated.

16. The touchscreen driver circuit according to claim 15, wherein the sampling circuit includes:
- an operational amplifier receiving the voltage, output from the first integrator circuit, through an inverting input terminal thereof, and receiving the voltage, output from the second integrator circuit, through a non-inverting input terminal thereof;
- a feedback capacitor and a reset switch connected between the inverting input terminal and an output terminal of the operational amplifier in parallel; and
- a feedback capacitor and a reset switch connected between the non-inverting input terminal and the output terminal of the operational amplifier in parallel.

* * * * *